United States Patent
Hirao et al.

[19]

[11] Patent Number: 5,974,090
[45] Date of Patent: *Oct. 26, 1999

[54] SPECIAL EYE PATTERN AND MODULATION AND DEMODULATION METHOD USING THE SAME

[75] Inventors: Kyoko Hirao; Takashi Kaku; Hiroyasu Murata, all of Kawasaki, Japan

[73] Assignee: Fujitsu Limited, Kawasaki, Japan

[*] Notice: This patent is subject to a terminal disclaimer.

[21] Appl. No.: 08/529,415

[22] Filed: Sep. 18, 1995

Related U.S. Application Data

[63] Continuation of application No. 08/108,509, Aug. 19, 1993, abandoned.

[30] Foreign Application Priority Data

Feb. 10, 1993 [JP] Japan ................................ 5-022637

[51] Int. Cl.⁶ .............................. H04L 5/12; H04L 23/02
[52] U.S. Cl. ..................... 375/261; 375/340; 329/304; 332/103
[58] Field of Search ............................. 375/222, 261, 375/262, 263, 279, 272, 340, 341; 329/300, 302, 304, 306; 332/100, 101, 103, 104

[56] References Cited

U.S. PATENT DOCUMENTS

| | | | |
|---|---|---|---|
| 4,538,284 | 8/1985 | Lang et al. ................................ | 375/39 |
| 4,601,044 | 7/1986 | Kromer ................................... | 375/17 |
| 4,959,842 | 9/1990 | Forney ................................... | 375/39 |
| 5,369,500 | 11/1994 | Jacobs ................................ | 375/261 X |
| 5,377,194 | 12/1994 | Calderbank ........................ | 375/261 X |
| 5,442,655 | 8/1995 | Dedic et al. ........................ | 375/261 X |
| 5,537,437 | 7/1996 | Kaku et al. ............................ | 375/231 |

FOREIGN PATENT DOCUMENTS

| | | |
|---|---|---|
| 0540232 | 5/1993 | European Pat. Off. . |
| 2207583 | 2/1989 | United Kingdom . |

OTHER PUBLICATIONS

Chung, Unequal Error Protection of Data Using Trellis-–Coded Modulation, GLOBECOM'92: IEEE Global Telecommunications Conference p. 1759–55, 1992.

*Primary Examiner*—Chi H. Pham
*Assistant Examiner*—Bryan Webster
*Attorney, Agent, or Firm*—Staas & Halsey LLP

[57] ABSTRACT

The invention relates to an eye pattern which is generated upon transmission and also to a modulation and demodulation method which employs the eye pattern. The eye pattern and the modulation and demodulation method are improved in that, by devising the arrangement of signal points, the timing jitter amount is minimized and a frequency offset can be followed up accurately. The eye pattern to be generated upon transmission is constructed such that the arrangement of signal points thereof is not symmetrical with respect to the origin on a signal point arrangement plane on which the signal points are arranged.

47 Claims, 12 Drawing Sheets

TURNED OVER BY 180°

EQUAL DISTANCE
(ALL POINTS ARE EQUALLY SPACED)

5,974,090

SPECIAL EYE PATTERN AND MODULATION AND DEMODULATION METHOD USING THE SAME

This application is a continuation, of application Ser. No. 08/108,509, filed Aug. 19, 1993, now abandoned.

BACKGROUND OF THE INVENTION

This invention relates to an eye pattern or signal point constellations which is generated upon transmission and also to a modulation and demodulation method which employs the eye pattern.

Modems (modulator-demodulators) are generally used widely for transmission of data in analog circuits which make use of a voice band.

Some modems make use, in addition to a main channel for transmitting main data of a terminal or a like element, of a secondary channel provided by frequency division for transmitting signal quality information, a reception level and some other information to supervise the state of the network.

FIG. 15 shows a general construction of an on-line system. Referring to FIG. 15, in the on-line system shown, a plurality of modems 203 are connected to a host computer 201 by way of a communication control apparatus (CCP) 202, and each of the modems 203 is connected by way of an analog circuit 204 to another modem 203' installed at another location. A terminal 205 is connected to each of the models 203'.

The on-line system further includes a network supervisory apparatus 206, for which a secondary channel is used.

By the way, a state signal of a modem can be transmitted, from each of the host side modems 203 shown in FIG. 15, as it is to the network supervisory apparatus 206, but from each of the terminal side modems 203', a state signal thereof is transmitted to the associated host side modem 203 so that it is transmitted by way of the modem 203 to the network supervisory apparatus 206.

Since a state signal of a modem must necessarily be transmitted without having any influence on main data, each of the modems 203 and 203' divides, for example, a voice band of 0.3 kHz to 3.4 kHz by frequency division to provide a secondary channel for secondary data in addition to a main channel for main data as seen in FIG. 16.

It is to be noted that phase shift keying (PSK), orthogonal amplitude modulation (OAM) or some other modulation is used for a main signal while frequency shift keying (FSK) is used for a secondary signal.

Meanwhile, a modem generates, upon transmission, signal points having a predetermined eye pattern (data point arrangement pattern on a phase plane) to modulate and transmit main data and secondary data and demodulates, upon reception, a reception signal to reproduce such main data and secondary data. When, for example, the transmission rate is 96 bps and the modulation rate is 48 Baud, the eye pattern of the secondary channel has an arrangement of points which is symmetrical with respect to the origin of the signal point arrangement plane as shown in FIG. 17.

By the way, it is required for modems in recent years to establish multiple point connection in addition to a rise of the communication rate to reduce the cost of the circuit. To this end, it is an effective technique to divide a frequency band of a main channel into a plurality of sub-bands to transmit a plurality of data by way of the same circuit. However where the technique is employed, since the roll-off ratio of the main channel is reduced very low, it is difficult to extract a timing component from the main channel. Therefore, it is necessary to extract a timing component from the secondary channel which has a high roll-off ratio.

However, when a timing component is extracted from the secondary channel in this manner, if the secondary channel has a jitter of, for example, 1% as seen in FIG. 18(a), then the jitter amount is 200 μsec, which does not matter at all when viewed from the secondary channel. However, when the jitter amount is viewed from the main channel wherein, for example, the transmission rate is 4,800 bps and the modulation rate is 2,400 Baud, since this corresponds to a jitter of 50% as seen from FIG. 18(b), there is a subject in that the jitter amount is very great to the secondary channel.

In particular, the jitter amount of 1% as viewed from the main channel is 4 μsec, and from this, if it is set that the required jitter amount is 4 μsec, then this corresponds to the jitter amount of 0.02% as viewed from the secondary channel. Consequently, the allowable jitter amount is very little. Thus, if the jitter amount of 0.02% must be realized, then also the arrangement of an eye pattern must be an ideal arrangement.

Further, where the signal point arrangement is such as shown in FIG. 17, when there is a frequency offset of 12 Hz, the rotational angle is 90° (360°×12/48), and consequently, the phase is stabilized at points displaced by 90°. As a result, it is determined in error that there is no offset, and consequently, it is difficult to follow up the offset.

SUMMARY OF THE INVENTION

It is an object of the present invention to provide a special eye pattern and a modulation and demodulation method employing the special eye pattern wherein the timing jitter amount is minimized and a frequency offset can be followed up accurately.

In order to attain the object described above, according to an aspect of the present invention, there is provided a special eye pattern in which signal points are generated upon transmission of a signal, wherein the arrangement of the signal points of the eye pattern is not symmetrical with respect to the origin on a signal point arrangement plane on which the signal points are arranged.

Preferably, the eye pattern has a signal point arrangement, wherein the signal points are dispersed on a concentric circle centered at the origin but are not arranged symmetrically with respect to the center of the concentric circle. In this instance, preferably the distances between adjacent ones of the signal points constituting the eye pattern are equal to each other.

Pseudo signal points may be arranged symmetrically with respect to the origin with the signal points having a signal point arrangement which is not symmetrical with respect to the origin on the signal point arrangement plane. In this instance, preferably, the distances between adjacent ones of the signal points and the pseudo signal points, which constitute the eye pattern, are equal to each other.

According to another aspect of the present invention, there is provided a modulation and demodulation method wherein signal points having an eye pattern are generated upon transmission to modulate and send data and a reception signal is demodulated upon reception to reproduce the data, wherein the signal point arrangement of the eye pattern to be generated upon transmission is not symmetrical with respect to the origin of a signal point arrangement plane on which the signal points are arranged.

According to a further aspect of the present invention, there is provided a modulation and demodulation method wherein a signal is divided into a main channel for main data and a secondary channel for secondary data by frequency division and, upon transmission, signal points having an eye pattern are generated to modulate and transmit the main data and the secondary data, and upon reception, a reception signal is demodulated to regenerate the main data and the secondary data, wherein the signal point arrangement of the eye pattern to be generated upon transmission is not symmetrical with respect to the origin of a signal point arrangement plane on which the signal points are arranged.

In the modulation and demodulation methods, preferably, the eye pattern to be generated upon transmission has a signal point arrangement wherein the signal points are dispersed on a concentric circle centered at the origin but is not arranged symmetrically with respect to the center of the concentric circle. In this preferably, the distances between adjacent ones of the signal points constituting the eye pattern are equal to each other.

After the signal points having the eye pattern are generated, pseudo signal points which are symmetrical with the signal points constituting the eye pattern with respect to the origin may be generated. In this instance, preferably the distances between adjacent ones of the signal points and the pseudo signal points which constitute the eye pattern are equal to each other.

Alternatively, after the signal points having the eye pattern are generated, the signal points constituting the eye pattern may be turned over by 0°/180°. In this instance, the processing of generating the signal points having the eye pattern and the processing of turning over the signal points, which constitute the eye pattern, by 0°/180° may be performed by code conversion means on the transmission side. Further, extraction of a signal timing upon demodulation may be performed using the reception signal after having been processed by turning over processing of the signal points, which constitute the eye pattern, by 0°/180°.

The modulation and demodulation methods may be constructed such that, when a signal wherein the signal points which constitute the eye pattern are turned over by 0°/180° is received, the signal points are turned over by 0°/180° to regenerate signal points which have the original eye pattern. In this instance, the processing of regenerating the signal points having the original eye pattern is performed on the reception side, and particularly, the processing of regenerating the signal points having the original eye pattern is performed at a stage next to equalization processing means on the reception side.

The signal having the eye pattern may be a signal of secondary data information for the secondary channel.

With the special eye pattern and the modulation and demodulation method employing the special eye pattern according to the present invention, the following effects or advantages can be achieved.

1. The timing jitter amount can be minimized.
2. It is possible to accurately follow up a frequency offset.
3. Accurate detection of a carrier can be realized even when the reception level is low.
4. Improvement in the signal to noise ratio characteristic can be anticipated.

Further objects, features and advantages of the present invention will become apparent from the following detailed description when read in conjunction with the accompanying drawings in which like parts or elements are denoted by like reference characters.

DESCRIPTION OF THE PREFERRED EMBODIMENT a. Principle of the Present Invention

Prior to description of a preferred embodiment of the present invention, the principle of the present invention will be described first.

Figure 1:
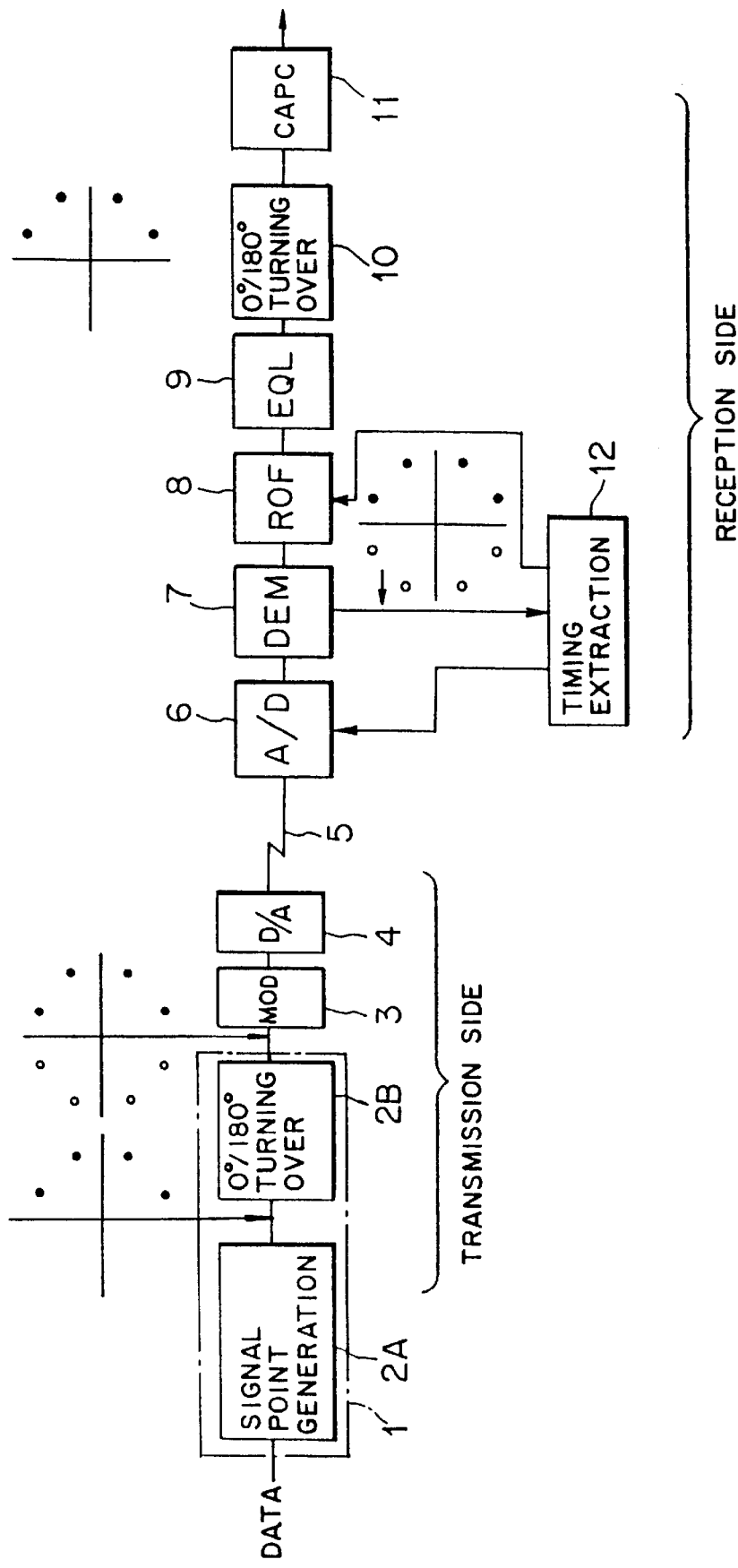
FIG. 1 is a block diagram illustrating the principle of the present invention.

FIG. 1 illustrates, in a block diagram, the principle of a modulation and demodulation system to which the present invention is applied. Referring to FIG. 1, the modulation and demodulation system includes code conversion means 1 for processing data to be transmitted by predetermined code conversion processing. The code conversion means 1 includes signal point generation means 2A for generation signal points having a desired eye pattern and 0°/180° turning over means 2B for turning over signal points constituting the eye pattern by 0°/180°. The modulation and demodulation system further includes modulation (MOD) means 3 and digital to analog (D/A) conversion means 4. The code conversion means 1, the modulation means 3 and the digital to analog conversion means 4 are provided on the transmission (modulation) side of the modulation and demodulation system.

The eye pattern to be generated upon transmission by the signal point generation means 2A has a signal point arrangement which is not symmetrical with respect to the origin of a signal point arrangement plane on which the signal points are arranged. In this instance, preferably the eye pattern has a signal point arrangement wherein the signal points are dispersed on a concentric circle centered at the origin, but are not arranged symmetrically with respect to the center of the concentric circle. Further, preferably the distances between adjacent ones of the signal points constituting the eye pattern are equal to each other (refer to an eye pattern at the output of the signal point generation means 2A in FIG. 1).

After such signal points having the predetermined eye pattern are generated from the signal point generation means 2A, the 0°/180° turning over means 2B generates pseudo signal points which are symmetrical with the signal points constituting the eye pattern with respect to the origin (center of the concentric circle). Consequently, an eye pattern wherein the pseudo signal points are disposed symmetrically with the signal points, which have a signal point arrangement which is not symmetrical with respect to the origin of the signal point arrangement plane, with respect to the origin is obtained. In this instance, preferably the distances between adjacent ones of the signal points and the pseudo signal points which constitute the eye pattern are equal to each other (refer to an eye pattern at the output of the 0°/180° turning over means 2B in FIG. 1).

The transmission side of the modulation and demodulation system is connected to the reception side by way of an analog circuit 5.

The modulation and demodulation system includes, on the reception (demodulation) side thereof, analog to digital (A/D) conversion means 6, demodulation means 7, band separation means 8 for processing an output of the demodulation means 7 by band separation processing, equalization means 9 for processing a reception signal by equalization processing, 0°/180° turning over means 10 for turning over the output of the equalization means 9 by 0°/180° to regenerate signal points having the original eye pattern, carrier phase correction means 11, and timing extraction means 12 for extracting, using a reception signal outputted from the demodulation means 7 and turned over by 0°/180° with respect to the signal points constituting the eye pattern, a signal timing for demodulation and determining the phase of the signal. The output of the timing extraction means 12 is used for processing at the analog to digital conversion means 6 or the band separation means 7.

According to the present invention, upon transmission, signal points having a special eye pattern which has a signal point arrangement which is not symmetrical with respect to the origin of the signal point arrangement plane are generated to modulate and transmit data, and then upon reception, a reception signal is demodulated to reproduce the data.

An eye pattern which has a signal point arrangement wherein the signal points are dispersed on a concentric circle centered at the origin, but are not arranged symmetrically with respect to the center of the concentric circle or wherein the distances between adjacent ones of the signal points constituting the eye pattern are equal to each other may be generated upon transmission.

More particularly, after signal points having the special eye pattern described above are generated by the signal point generation means 2A, the signal points constituting the eye pattern are rotated by 0°/180° by the 0°/180° turning over means 2B to generate pseudo signal points which are symmetrical with the signal points constituting the eye pattern with respect to the origin. In this instance, preferably the distances between adjacent ones of the signal points and pseudo signal points which constitute the eye pattern are equal to each other.

Then, using the reception signal wherein the signal points constituting the eye pattern have been processed by 0°/180° turning over processing, extraction of a signal timing for demodulation is performed by the timing extraction means 12.

Further, when a signal wherein the signal points constituting the eye pattern have been processed by 0°/180° turning over processing is received, 0°/180° turning over processing is performed for the signal points by the 0°/180° turning over means 10 to regenerate signal points having the original eye pattern.

The present invention can be applied also to a modulation and demodulation system which modulates and demodulates a signal divided by frequency division into a main channel for main data and a secondary channel for secondary data. In this instance, upon transmission, signal points having such special eye pattern as described above which is not symmetrical with respect to the origin of the signal point arrangement plane are generated to modulate and transmit the main data and the secondary data, and upon reception, a reception signal is demodulated to reproduce the main data and the secondary data. Then, the special eye pattern is regenerated on the reception side in such a manner as described above. Details of the special eye pattern are same as those described above.

Advantageously, the signal having the eye pattern is used for secondary data information for the secondary channel.

Accordingly, with the special eye pattern and the modulation and demodulation method which employs the special eye pattern, the timing jitter amount can be minimized and it is possible to accurately follow up a frequency offset. Further, even if the reception level is low, accurate detection of a carrier can be realized and a good signal to noise ratio characteristic can be anticipated.

b. Description of a Preferred Embodiment

Figure 2:
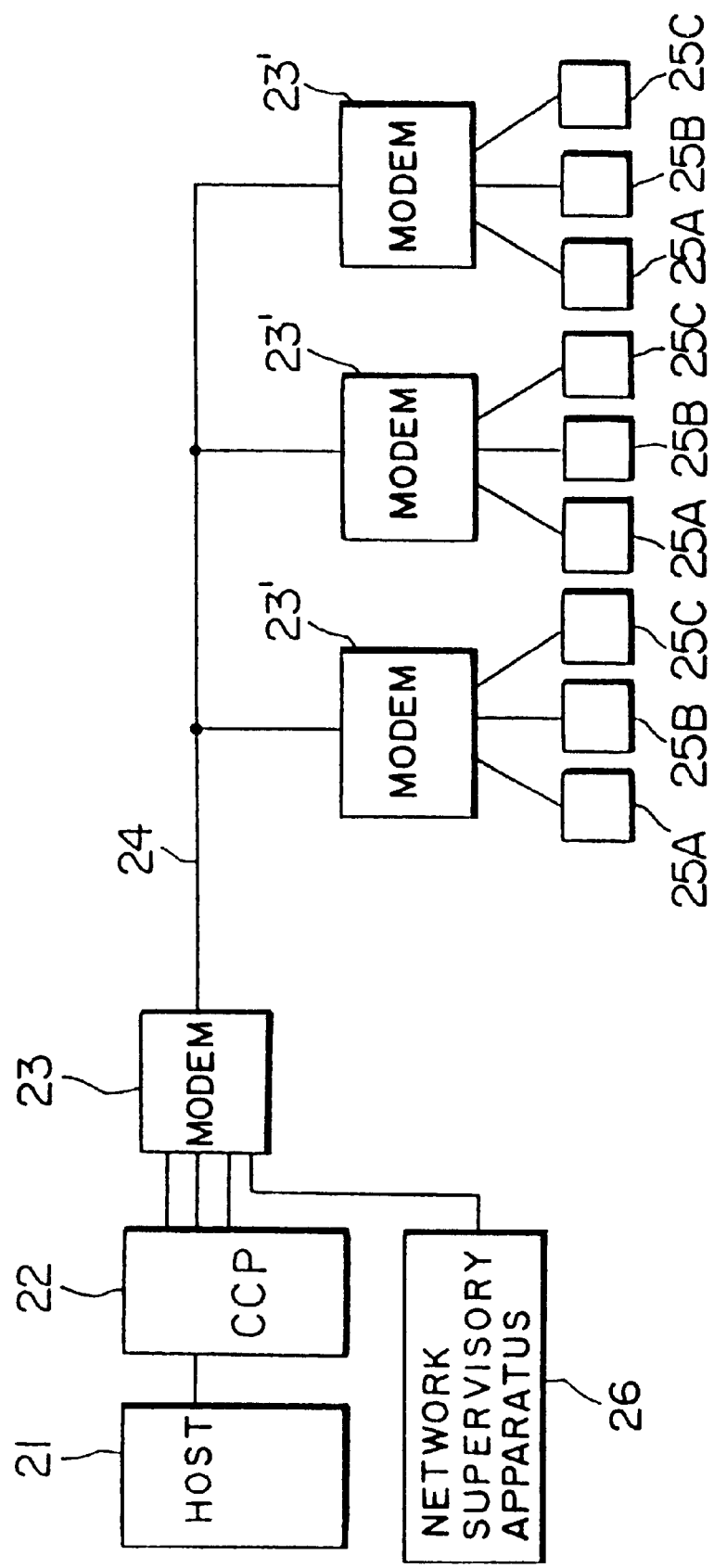
FIG. 2 is a block diagram of an on-line system to which the present invention is applied.

Now, a preferred embodiment of the present invention is described in detail. Referring first to FIG. 2, there is shown an on-line system to which the present invention is applied. The on-line system shown includes a modem 23 connected to a host computer 21 by way of a communication control apparatus (CCP) 22 and serving as a parent station. A plurality of modems 23' are connected to the modem 23 by way of an analog circuit 24. The modems 23' are installed at different locations from the modem 23 and each serves as a child station. A plurality of terminals 25A to 25C are connected to each modem 23'. The on-line system further includes a network supervisory apparatus 26.

Figure 5:
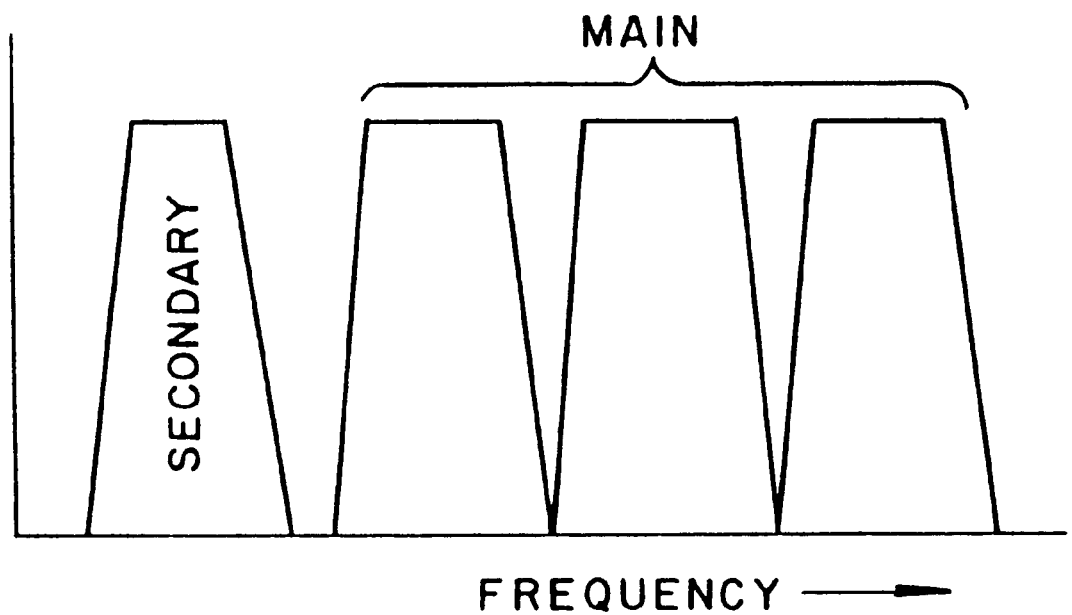
FIG. 5 is a diagram showing frequency bands of a main channel and a secondary channel used in the on-line system of FIG. 2.

Each of the modems 23 and 23' divides a voice band, for example, into three main channels for main data and a secondary channel for secondary data for network supervision as seen in FIG. 5 by frequency division and generates, upon transmission, signal points having a predetermined eye pattern to modulate and transmit data (main data and secondary data), whereas it demodulates, upon reception, a reception signal to reproduce data (main data and secondary data). Thus, as shown in FIG. 2, the child station modems 23' can be connected by multi-point connection to the parent station modem 23 by way of the common analog circuit 24.

Figure 3:
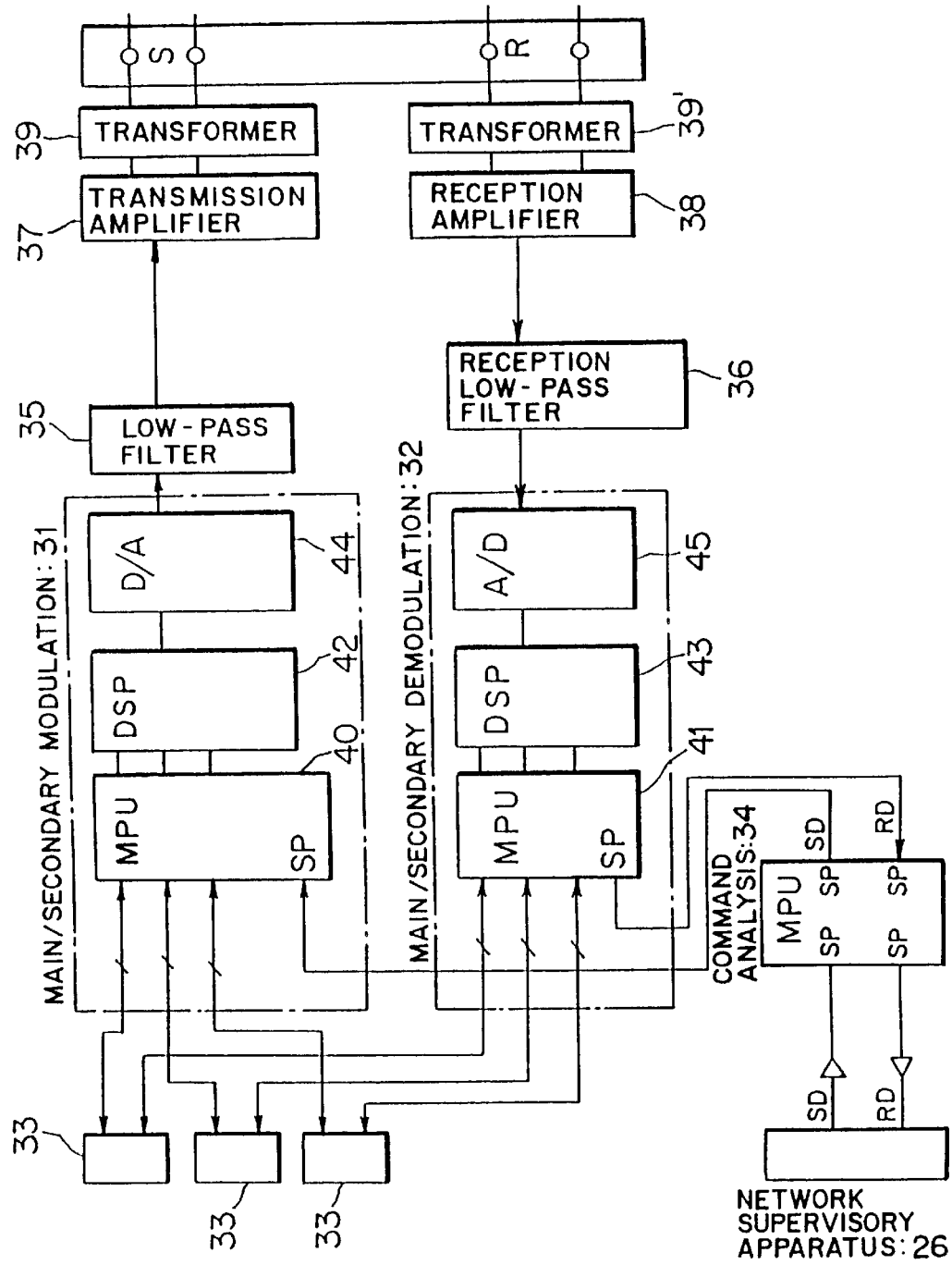
FIG. 3 is a block diagram of essential part of a modem in which a reception level adjustment circuit according to the present invention is incorporated.

Referring now to FIG. 3, in order for the modem 23 to exhibit such functions as described just above, it includes a main/secondary modulation section 31 and a main/secondary demodulation section 32, and further includes a plurality of interface sections 33 with the communication control apparatus 22, and a command analysis section 34 interposed between the modem 23 and the network supervisory apparatus 26. The modem 23 further includes a transmission low-pass filter 35, a reception low-pass filter 36, a transmission amplifier 37, a reception amplifier 38 and a pair of transformers 39 and 39'.

Each of the interface sections 33 connects the communication control apparatus 22 and the modem 23 to each other with a synchronous interface (RS232C). The command analysis section 34 performs an analysis of a command from the network supervisory apparatus 26 and production of a response to the network supervisory apparatus 26 and has a function of transferring transmission or reception data SD or RD by way of serial ports SP thereof by high speed serial transfer. Further, the command analysis section 34 connects the network supervisory apparatus 26 and the modem 23 to each other with a start-stop interface (RS485).

The main/secondary modulation section 31 includes a microprocessor unit (MPU) 40, a digital signal processor (DSP) 42 and a digital to analog (D/A) converter 44. The main/secondary demodulation section 32 includes an MPU 41, a DSP 43 and an analog to digital (A/D) converter 45. The MPUs and DSPs constituting the main/secondary modulation section 31 and the main/secondary demodulation section 32 may individually be provided by suitable plural numbers depending upon the capacity or processing faculty of the modem 23.

Figure 4:
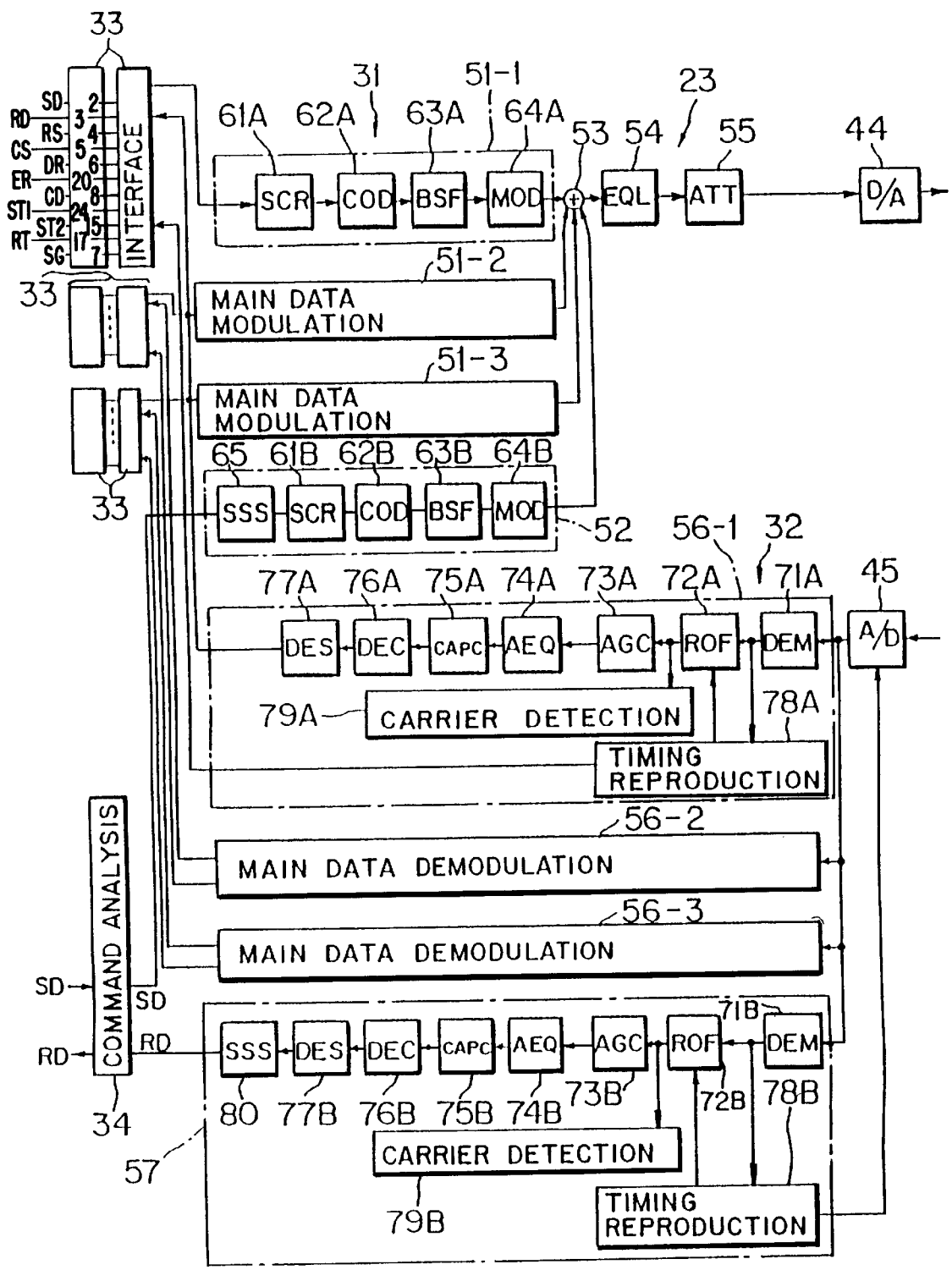
FIG. 4 is a block diagram showing details of the modem shown in FIG. 3.

Now, essential part of the modem 23 will be described in more detail. Referring now to FIG. 4, the modem 23 includes, in the main/secondary modulation section 31, three main data modulation sections 51-1, 51-2 and 51-3 and a secondary data modulation section 52 as well as an addition section 53, a fixed equalizer 54 and a transmission attenuator 55.

The main data modulation sections 51-1 to 51-3 modulate main data and are provided by a number equal to the number of main channels, that is, 3. Each of the main data modulation sections 51-1 to 51-3 includes a scrambler 61A, a code conversion section 62A, a transmission base band filter 63A and a modulation section 64A. It is to be noted that, while the detailed construction is shown only of the main data modulation section 51-1 in FIG. 4, also the other main data modulation sections 51-2 and 51-3 have the same construction as described above.

Here, the scrambler 61A scrambles a signal into a random signal, and the code conversion section 62A performs desired code conversion for the output of the scrambler 61A. Upon such code conversion, the code conversion section 62A generates a signal point having a desired eye pattern (data point plot pattern on a phase plane).

The transmission base band filter 63A passes a base band component of a digital output of the code conversion section 62A, and the modulation section 64A modulates the output of the base band filter 63A with a corresponding main channel frequency.

Meanwhile, the secondary data modulation section 52 modulates secondary data and includes a start-stop synchronization conversion section 65, a scrambler 61B, a code conversion section 62B, a transmission base band filter 63B, and a modulation section 64B.

Here, the start-stop synchronization conversion section 65 performs conversion processing from a start-stop interface to a synchronization interface, and the scrambler 61B, the code conversion section 62B, the transmission base band filter 63B and the modulation section 64B have similar functions to those of the scrambler 61A, the code conversion section 62A, the transmission base band filter 63A and the modulation section 64A, respectively. It is to be noted that the modulation frequency at the modulation section 64B is the secondary channel frequency.

It is to be noted that the transmission MPU 40 shown in FIG. 3 has the functions of the scramblers 61A and the code conversion sections 62A of the main data conversion sections 51-1 to 51-3 and the start-stop synchronization conversion section 65, the scrambler 61B and the code conversion section 62B of the secondary data conversion section 52, and the transmission DSP 42 shown in FIG. 3 has the functions of the transmission base band filters 63A and the modulation sections 64A of the main data conversion sections 51-1 to 51-3, the base band filter 63B and the modulation section 64B of the secondary data conversion section 52, the addition section 53, the fixed equalizer 54 and the transmission attenuator 55.

Further, the modem 23 includes, in the main/secondary modulation section 32, three main data demodulation sections 56-1, 56-2 and 56-3 and a secondary data demodulation section 57.

The main data demodulation sections 56-1 to 56-3 demodulate main data and are provided also by a number equal to the number of main channels, that is, 3. Each of the main data demodulation sections 56-1 to 56-3 includes a demodulation section 71A, a roll-off filter (band separation filter) 72A, an automatic gain control section 73A, an automatic equalization section 74A, a carrier phase correction section 75A, a code conversion section 76A and a descrambler 77A as well as a timing reproduction section 78A and a carrier detection section 79A. It is to be noted that, while only the detailed construction is shown only of the main data demodulation section 56-1 in FIG. 4, also the other main data demodulation sections 56-2 and 56-3 have the same construction as described above.

Here, the demodulation section 71A applies demodulation processing to a reception signal after digital conversion by the A/D converter 45, and the roll-off filter 72A passes only a signal of a predetermined frequency range of the digital output of the demodulation section 71A. A transversal filter is used for the demodulation section 71A. Further, where the main channel is divided into a plurality of (three) main channels as in the present embodiment, the frequency cut-off characteristic of the roll-off filter 72A must necessarily be set steep from the necessity to narrow the band widths to make a rigid distinction between each adjacent frequencies, and to this end, the roll-off rate (ROF rate) of the roll-off filter 72A is set low (for example, to 3 to 5% or so).

The automatic gain control section 73A constitutes automatic reception level adjustment means for adjusting the loop gain so that the level of the demodulation signal band-limited by the roll-off filter 72A may be equal to a predetermined reference value and inputting the modulation signal to the automatic equalization section 74A at the next stage. The automatic gain control section 73A is required to allow the automatic equalization section 74A at the next stage to operate accurately.

The automatic equalization section 74A performs equalization processing for correcting a transmission distortion and so forth of the circuit, and the carrier phase correction section 75A corrects the phase of a carrier from the output of the automatic equalization section 74A.

The code conversion section 76A decodes a coded signal of the output of the carrier phase correction section 75A, and the descrambler 77A descrambles an output of the code conversion section 76A, which is in a scrambled condition as a result of processing at the scrambler 61A in the main/secondary modulation section 31, back into an original signal.

The timing reproduction section 78A extracts a signal timing from the output of the demodulation section 71A and determines where a signal timing is present. The output of the timing reproduction section 78A is supplied to the roll-off filter 72A and the corresponding interface circuit 33.

The carrier detection section 79A detects a carrier to detect whether data have been received, and the output of the carrier detection section 79A is supplied to a sequencer not shown and thus provides trigger information to the sequencer.

Meanwhile, the secondary data demodulation section 57 demodulates secondary data and includes a demodulation section 71B, a roll-off filter (band separation filter) 72B, an automatic gain control section 73B, an automatic equalization section 74B, a carrier phase correction section 75B, a code conversion section 76B, a descrambler section 77B, and a synchronization to start-stop conversion section 80 as well as a timing reproduction section 78B and a carrier detection section 79B.

Here, the synchronization to start-stop conversion section 80 performs conversion processing from a synchronization interface to a start-stop interface, and the demodulation section 71B, the roll-off filter 72B, the automatic gain control section 73B, the automatic equalization section 74B, the carrier phase correction section 75B, the code conversion section 76B, the descrambler section 77B, the timing reproduction section 78B and the carrier detection section 79B have similar functions to those of the demodulation section 71A, the roll-off filter 72A, the automatic gain control section 73A, the automatic equalization section 74A, the carrier phase correction section 75A, the code conversion section 76A, the descrambler section 77A, the timing reproduction section 78A and the carrier detection section 79A, respectively.

However, the roll-off filter 72B of the secondary data demodulation section 57 need not necessarily have a steep frequency cut-off characteristic since the secondary channel is not divided any more, and accordingly, the roll-off rate (ROF rate) of the roll-off filter 72B is set high comparing with the roll-off filters 72A for the main channels, for example, to 30 to 40%.

Figure 6:
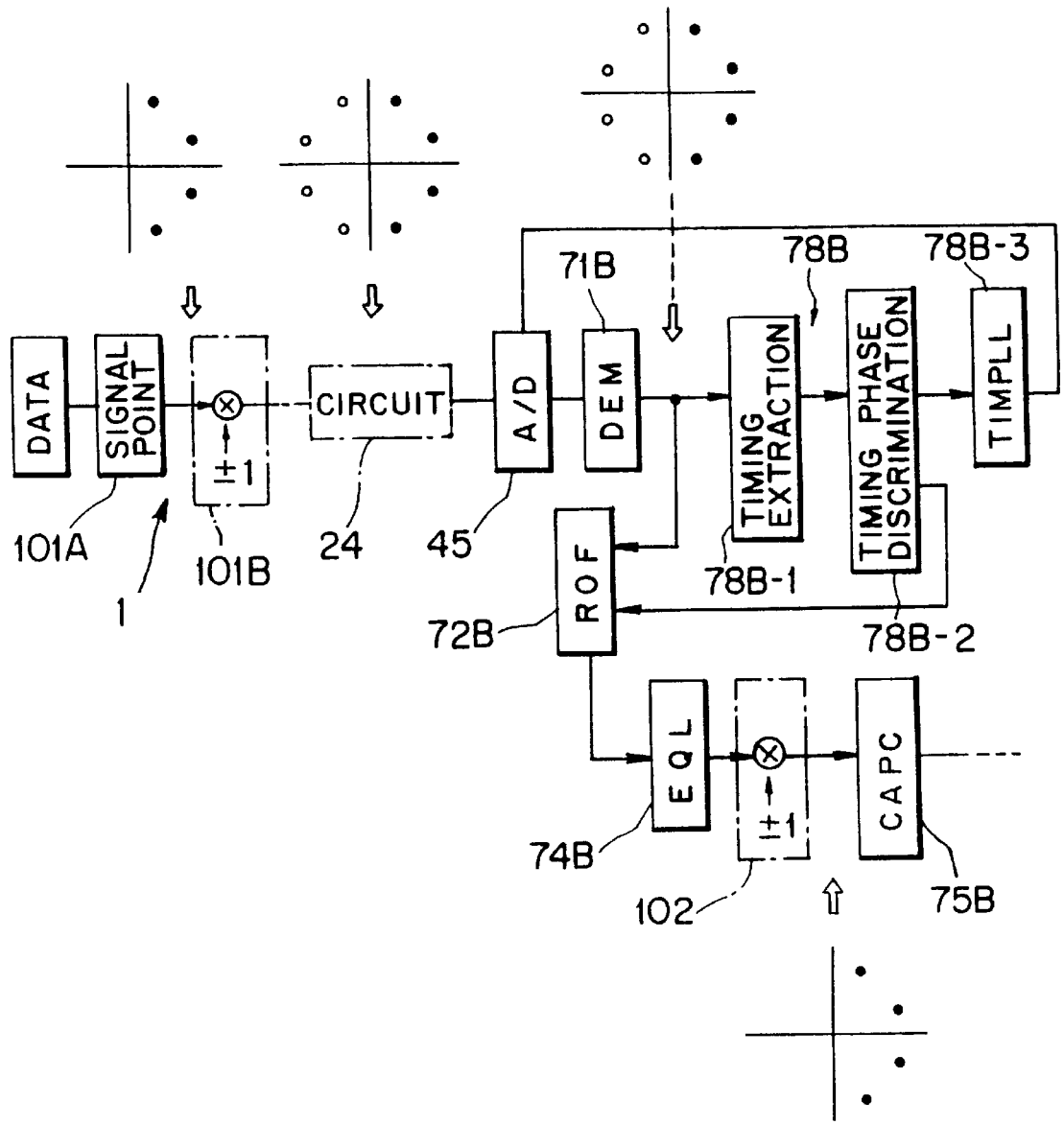
FIG. 6 is a block diagram showing a modulation and demodulation system to which the present invention is applied.

Meanwhile, the timing reproduction section 78B of the secondary data demodulation section 57 extracts a signal timing from the output of the demodulation section 71B and determines where a signal timing is present. In particular, referring to FIG. 6, the timing reproduction section 78B includes a timing extraction section 78B-1 for extracting a signal timing from the output of the demodulation section 71B, a timing phase discrimination section 78B-2 for discriminating at which position a signal timing is, and a timing PLL (phase-locked loop) section 78B-3 having a PLL portion for outputting a phase-locked signal. Then, referring back to FIG. 4, the output of the timing reproduction section 78B is supplied to the roll-off filter 72B and the A/D converter 45. Accordingly, the frequency timing of the secondary data is used as a sampling timing for a digital value by the A/D converter 45. The reason why the frequency timing of the secondary data is used as a sampling timing for a digital value by the A/D converter 45 is that the ROF rate in the main channels is so low that it is difficult to extract a timing component from any of the main channels.

It is to be noted that the reception DSP 43 shown in FIG. 3 has the functions of the demodulation sections 71A, the roll-off filters 72A, the automatic gain control sections 73A, the automatic equalization sections 74A, the carrier phase correction sections 75A, the timing reproduction sections 78A and the carrier detection sections 79A of the main data demodulation sections 56-1 to 56-3 and the demodulation section 71B, the roll-off filter 72B, the automatic gain control section 73B, the automatic equalization section 74B, the carrier phase correction section 75B, the timing reproduction section 78B and the carrier detection section 79B of the secondary data demodulation section 57, and the reception MPU 41 shown in FIG. 3 has the functions of the code conversion sections 76A and the descramblers 77A of the main data demodulation sections 56-1 to 56-3 and the code conversion section 76B, the descrambler 77B and the synchronization to start-stop conversion section 80 of the secondary data demodulation section 57.

It is to be noted that also the modems 23' serving as child stations have a substantially same construction as the modem 23 serving as the parent station.

In the present embodiment, the code conversion section 62B provided in the secondary data transmission method has, in addition to the function of applying predetermined code conversion processing to data to be transmitted, the function of signal point generation processing means 101A for generating signal points having a desired eye pattern and 0°/180° turning over means 101B for applying 0°/180° turning over processing to signal points constituting the eye pattern from the signal point generation means 101A.

Here, the arrangement of signal points of an eye pattern generated upon transmission from the signal point generation means 101A is not symmetrical with respect to the origin of the signal point arrangement plane. In particular, in the signal point arrangement of the eye pattern, four signal points are dispersed on a concentric circle centered at the origin such that they are not symmetrical with respect to the center of the concentric circle as shown by dark small circles in FIGS. 7, 8 and 14(a). Further, the signal points constituting the eye pattern are spaced by an equal distance from each other.

Figure 8:
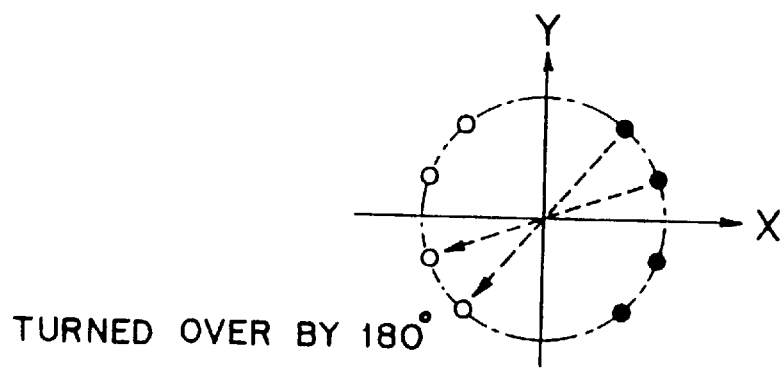
Figure 14A:
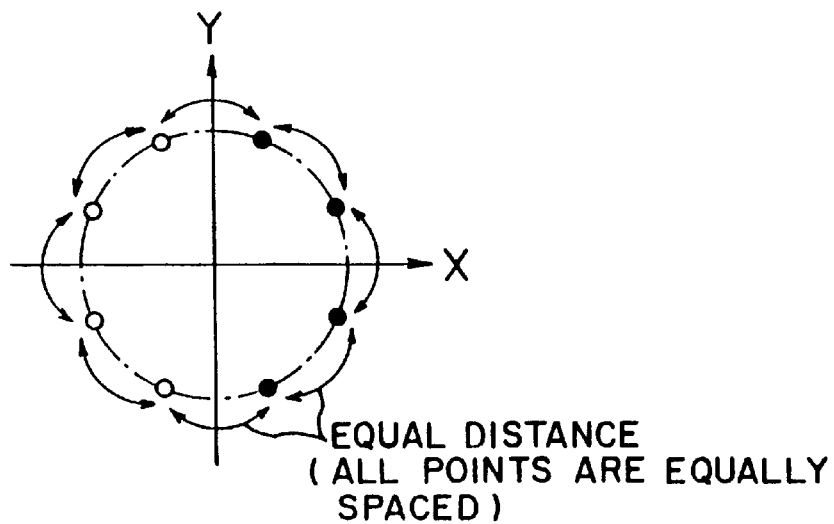
FIGS. 14(*a*) to 14(*e*) are diagrammatic views illustrating different eye patterns.
Figure 14C:
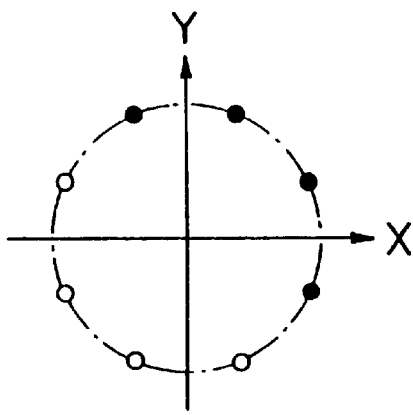
Figure 14B:
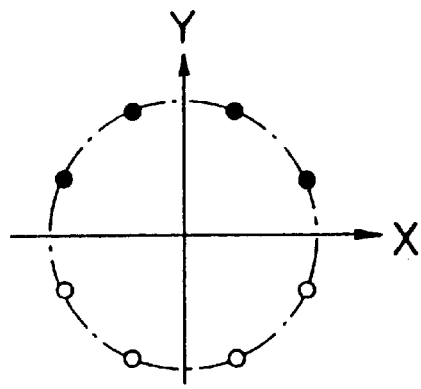
Figure 14D:
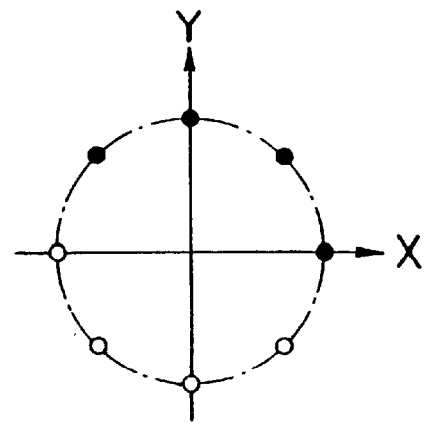
Figure 14E:
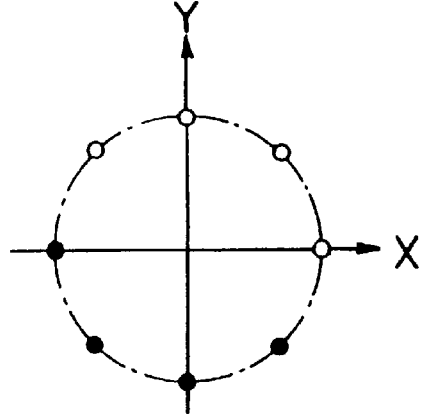
Figure 15:
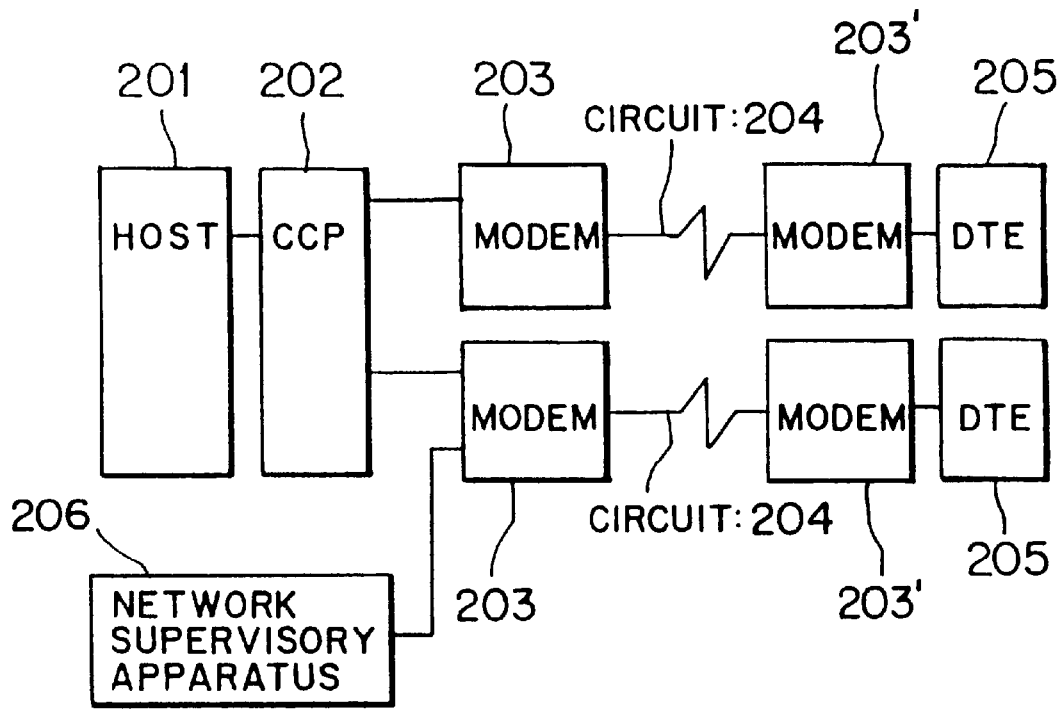
FIG. 15 is a block diagram showing an on-line system.
Figure 16:
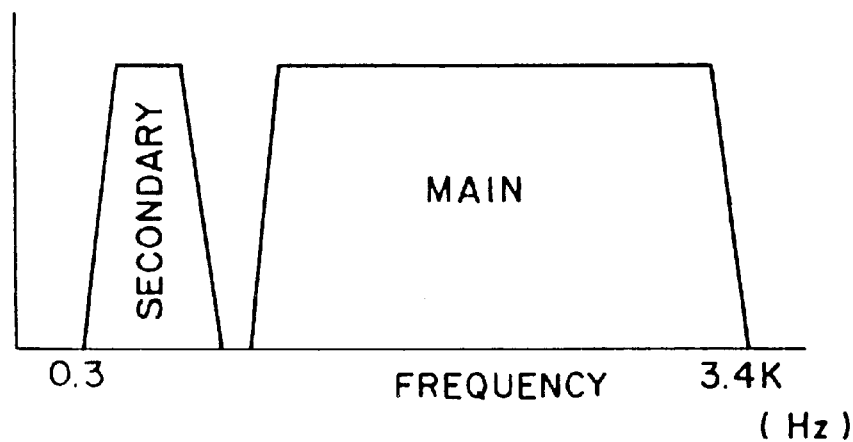
FIG. 16 is a diagram showing frequency bands of a main channel and a secondary channel used in the on-line system shown in FIG. 15.
Figure 17:
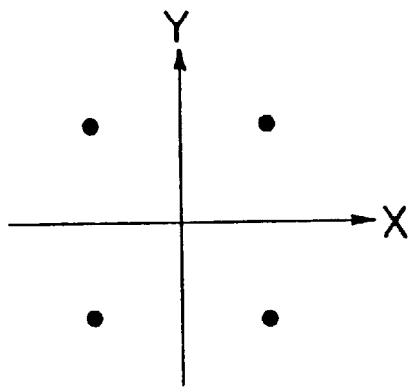
FIG. 17 is a diagrammatic view showing an eye pattern.
Figure 18A:
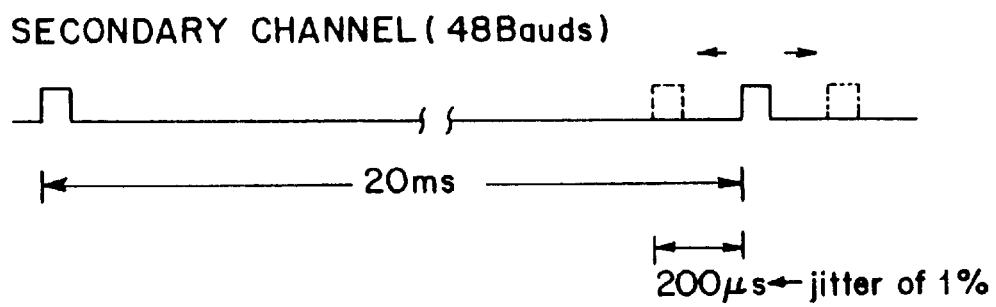
FIGS. 18(*a*) and 18(*b*) are waveform diagrams showing jitter ratios of a main channel and a secondary channel.
Figure 18B:
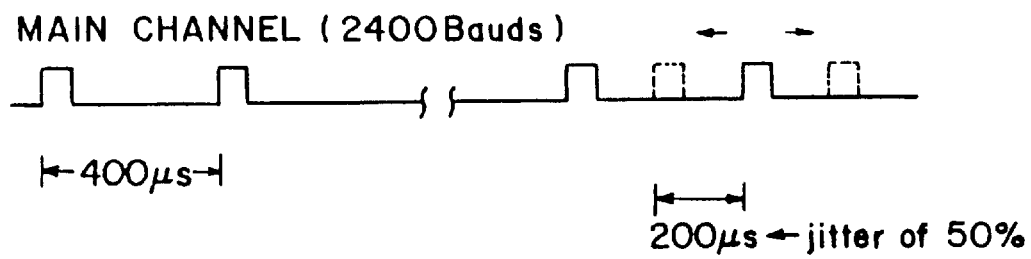

The 0°/180° turning over processing means 101B generates, after such signal points having the predetermined eye pattern are generated from the signal point generation means 101A, pseudo signal points which are symmetrical with the signal points constituting the eye pattern with respect to the origin (center of the concentric circle) as indicated by blank small circles in FIGS. 8 and 14(a). Consequently, the original signal points (dark small circles) and the pseudo signal points (blank small circles) turned over by 180° from the original signal points are alternately sent out from the 0°/180° turning over processing means 101B to obtain twice (eight) signal points.

It is to be noted that actually the signal points and the pseudo signal points constituting an eye pattern are spaced by an equal distance from each other as seen in FIG. 14(a).

Subsequently, the reason why the timing jitter amount can be minimized and the follow-up to a carrier frequency offset can be performed readily by sending out signal points in such a technique as described above will be described.

Figure 9:
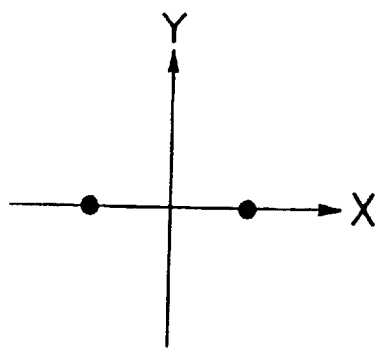

First, if it is intended only to minimize the timing jitter amount, then two signal points should be arranged in a spaced relationship by 180° from each other as seen in FIG. 9. However, while such arrangement is ideal for extraction of a timing component, because only two signal points are involved, secondary channel information cannot be sent.

In order to send secondary channel information, a random signal of at least four values is required. However, if only extraction of timing components is considered, then when a timing component is to be extracted from a random signal, an increase of the number of values of the random signal will allow extraction of more accurate timings since the amount of timing information increases as the conditions to which the random signal can change from the present condition.

Now, if the energy of a timing component upon transmission of a random signal with a filter of the ROF ratio of 100% is compared, when the random signal has two values, the energy is $10 \cdot \log(1/2) = -3.0$ dBm; when the random signal has four values, the energy is $10 \cdot \log(3/4) = -1.25$ dBm; when the random signal has eight values, the energy is $10 \cdot \log(7/8) = -0.58$ dBm; when the random signal has 16 values, the energy is $10 \cdot \log(15/16) = -0.28$ dBm; . . . ; and when the random signal has 128 values, the energy is $10 \cdot \log(127/128) = -0.03$ dBm. It is to be noted that the value in each parenthesis above represents the probability at which transition to another point is allowed after one baud rate. Further, the timing components when the phases of 0°/180° are sent alternately at 1:1 between two points is given by $10 \cdot \log 1 = 0$ dBm.

As can be seen from the foregoing description, when a random signal is to be sent out, as the number of signal points increases, the number of timing components increases and extraction of a higher degree of accuracy is allowed.

Figure 7:
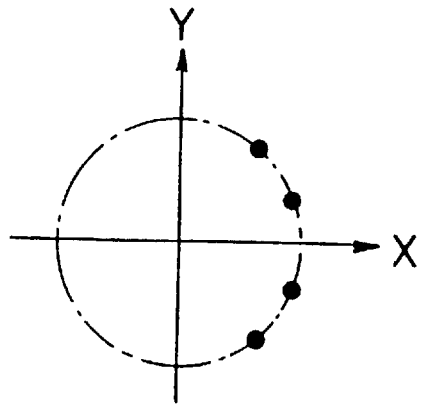
FIGS. 7 to 13 are diagrammatic views illustrating several eye patterns.
Figure 10:
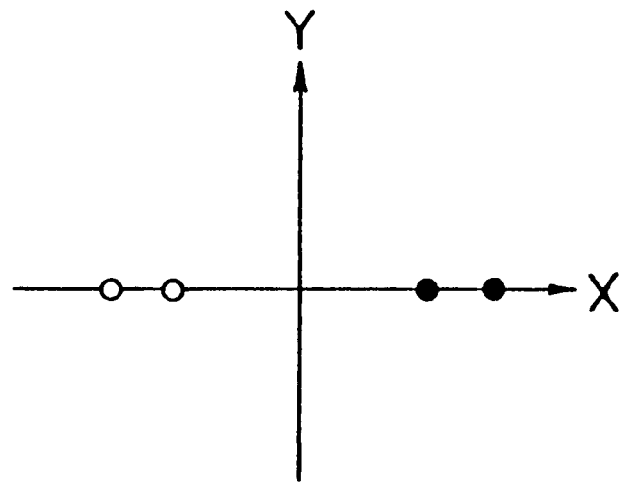

Here, when such four non-linear values as seen in FIG. 7 are multiplied by ±1 on the transmission side to obtain such eight values as seen in FIG. 8 and the thus obtained eight values are sent out, the values have, on the real side, alternate positive and negative (±) polarities without fail. Accordingly, considering roughly, the transmission in this instance is equivalent to alternate transmission in phases of 0°/180° between two points as seen in FIG. 10.

Meanwhile, on the imaginary side, the random signal has four values, and accordingly, the energy of the random signal is given by $10 \cdot \log(0.5(1+0.75)) = -0.51$ dBm, which is higher than the energy of a random signal of four values.

Actually, since a filter having a ROF ratio of about 50% or less is used, the energy of a timing component of a random signal upon transmission is given, when the random signal has two values, by $10 \cdot \log(1/2 \times 0.5) = -6.02$ dBm; when the random signal has four values, the energy is given by $10 \cdot \log(3/4 \times 0.5) = -4.26$ dBm; when the random signal has eight values, the energy is given by $10 \cdot \log(7/8 \times 0.5) = -3.59$ dBm; . . . ; and when the random signal has 128 values, the energy is given by $10 \cdot \log(127/128 \times 0.5) = -3.04$ dBm. Further, when such four non-linear values as seen in FIG. 7 are multiplied by ±1 on the transmission side to obtain such eight values as seen in FIG. 8 and the eight values are transmitted, the energy of the random signal is given by $10 \cdot \log(0.5(1+0.75 \times 0.5) = -1.63$ dBm, and it can be seen that the effect obtained here is higher than that achieved by simply transmitting a random signal to increase signal points.

It is to be noted that it is possible to multiply an increased number of, eight, non-linear values by ±1 to obtain 16 values and send out such 16 values, and while this increases the energy for extraction of a timing component, since a table (memory) for storage of signal points upon generation of such signal points requires a very large capacity, the burden is heavy in regard to the capacity of the ROM. Accordingly, in the present embodiment, the technique of multiplying four non-linear values by ±1 on the transmission side to obtain and send out eight values.

Figure 11:
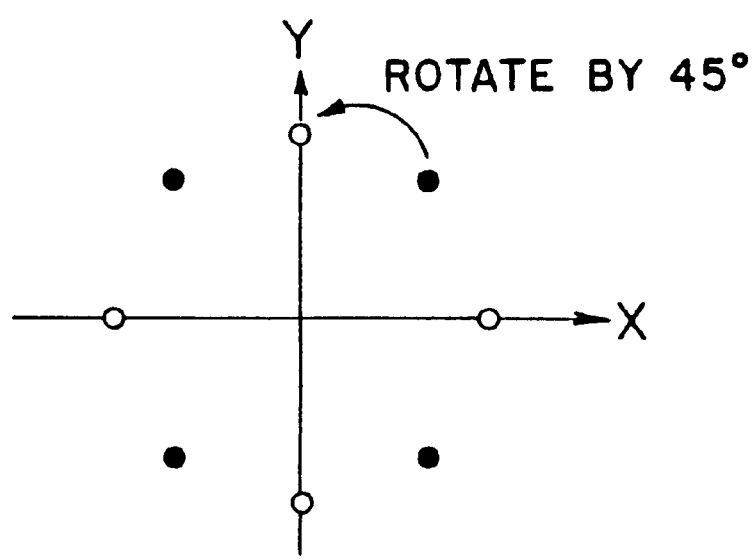

Further, as regards extraction of a timing component, it is also possible to rotate four non-linear values by 45° in phase to make four pseudo signal points and send out a total of eight values as seen in FIG. 11. With this technique, however, since the original reception points resultantly come to symmetrical positions, the follow-up to a frequency offset, which is the other subject, is difficult.

Figure 12:
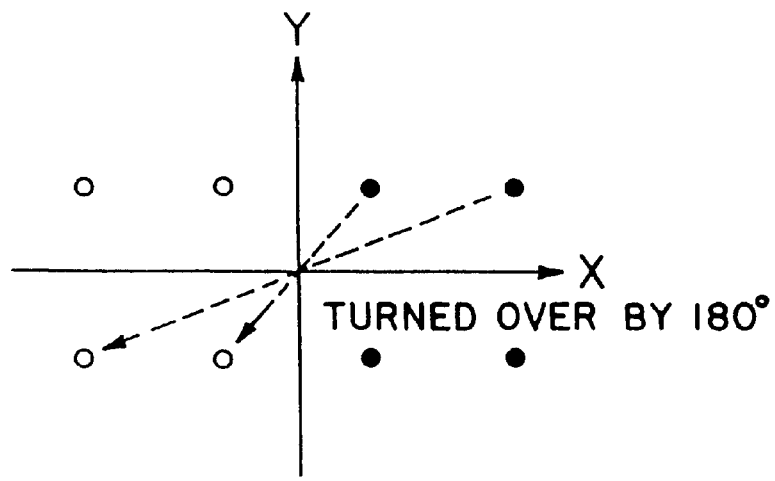
Figure 13:
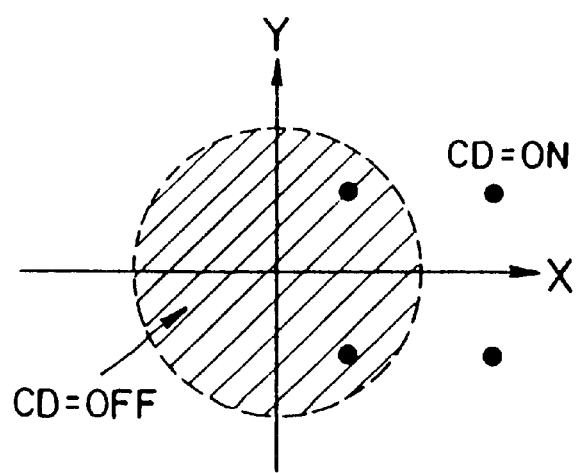

Further, the point arrangement of an eye pattern to be generated upon transmission may be such a point arrangement which is not symmetrical with respect to the origin of the signal point arrangement plane as shown in FIG. 12. With the point arrangement, since pseudo signal points generated at symmetrical positions with the signal points, which constitute the eye pattern, with respect to the origin appear at positions indicated by blank small circles in FIG. 12, better results for both of extraction of a timing component and a frequency offset than those of such a pattern as shown in FIG. 11 can be obtained. However, with a pattern as shown in FIG. 12, since the energy is not equal among all of the signal points, when the reception level is low, a dispersion may possibly take place in detection of a carrier by the carrier detection section 79B as seen from FIG. 13.

Accordingly, an eye pattern as shown in FIG. 8 or 14(*a*), wherein the signal points are arranged on a concentric circle, can be considered best as the eye pattern which minimizes the timing jitter amount and allows easy follow-up to a carrier frequency offset. Therefore, in the present embodiment, the pattern shown in FIG. 8 or 14(*a*) is adopted. Further, since the distances between the signal points are set equal to each other, also the signal to noise (S/N) ratio can be improved.

Further, the eye pattern of the point arrangement on a concentric circle may be modified so that it has such point arrangements as indicated by dark small circles in FIGS. 14(*b*) to 14(*e*). In this instance, pseudo signal points obtained by turning over the signal points by 180° in phase are positioned as indicated by blank small circles in FIGS. 14(*b*) to 14(*e*). In all of the eye patterns shown in FIGS. 14(*b*) to 14(*e*), the distances between the signal points and the pseudo signal points constituting the eye patterns are equal to each other.

In this manner, whichever one of the eye patterns shown in FIGS. 14(*a*) to 14(*e*) is employed, by what times the signal points are rotated in angle, they are stabilized in only one phase due to presence of a frequency offset. Accordingly, it is possible to follow up the offset accurately without fail.

Referring back to FIG. 6, on the demodulation side of the modulation and demodulation system, 0°/180° turning over means 102 for turning over the output of the automatic equalizer 74B by 0°/180° to regenerate signal points having the original eye pattern is provided. The 0°/180° turning over means 102 may be provided at the preceding stage or the following stage of the automatic equalizer 74B.

With the construction described above, upon transmission, main data are modulated in the corresponding main channels by the main data modulation sections 51-1 to 51-3 while secondary data are modulated in the secondary channel by the secondary modulation section 52. Then the outputs of the modulation sections 51-1 to 51-3 are added by the adder 53 and then processed by required processing by the fixed equalizer 54 and the transmission attenuator 55, whereafter they are converted into an analog signal by the D/A converter 44 and then sent into the analog circuit 24.

In this instance, the code conversion section 62B of the secondary data modulation section 52 generates, using the signal point generation means 101A thereof, signal points having such a special eye pattern wherein the signal points have such a point arrangement which is not symmetrical with respect to the origin of the signal point arrangement plane, and then applies, using the 0°/180° turning over processing means 101B, 0°/180° turning over processing to the signal points which constitute the eye pattern to generate pseudo signal points which are symmetrical with the signal points constituting the eye pattern with respect to the origin (refer to FIGS. 8 and 14(*a*) to 14(*e*)).

Then, on the reception side, a reception signal is converted from an analog signal into a digital signal by the analog to digital converter 45, and main data of the reception signal are demodulated and reproduced by the main data demodulation sections 56-1 to 56-3 while secondary data are demodulated and reproduced by the secondary data demodulation section 57.

In this instance, in the secondary data demodulation section 57, a signal timing for demodulation is extracted by the timing extraction section 78B using the reception signal after 0°/180° turning over processing has been performed for the signal points of the reception signal constituting the special eye pattern.

Further, when the signal obtained by applying 0°/180° turning over to the signal points constituting the eye pattern is received, 0°/180° turning over is applied to the signal points by the 0°/180° turning over processing means 102 to regenerate signal points having the original eye pattern.

It is to be noted that, while the regeneration processing to the signal points having the original eye pattern described above is performed at a succeeding stage to the automatic equalization section 74B of the secondary data demodulation section 57, it may be performed otherwise at a preceding stage to the automatic equalization section 74B.

In this manner, in the present embodiment, the point arrangement of an eye pattern generated upon transmission is such a point arrangement that the signal points are dispersed on a concentric circle centered at the origin and are not symmetrical with respect to the center of the concentric circle and the distances of the signal points and pseudo signal points constituting the eye pattern are equal to each other. After signal points having such a predetermined eye pattern as described above are generated, 0°/180° turning over processing is applied to the signal points constituting the eye pattern. Accordingly, the timing jitter amount can be minimized, and also it is possible to follow up a frequency offset accurately. Further, even if the reception level is low, accurate detection of a carrier can be realized, and also improvement in signal to noise characteristic can be anticipated.

It is to be noted that the present invention can similarly be applied, in addition to a modulation and demodulation method which modulates and demodulates a signal into a main channel for main data and a secondary channel for secondary data (refer to the embodiment described above) by frequency division, to another modulation and demodulation method (such as, for example, a base band modulation and demodulation method) wherein signal points having such a special eye pattern wherein the signal points are not arranged symmetrically with respect to the origin of the signal point arrangement plane are generated upon transmission to modulate and transmit data and a reception signal upon reception is demodulated to effect reproduction of the data (including regeneration of the special eye pattern).

The present invention is not limited to the specifically described embodiment, and variations and modifications may be made without departing from the scope of the present invention.

What is claimed is:

1. An apparatus for generating signal point constellations, comprising:
   means for generating a plurality of signal points of the signal point constellations; and
   means for continuously arranging the signal points of the signal point constellations with the signal points being not symmetrical with respect to an origin on a signal point arrangement plane on which the signal points are arranged, and with pseudo signal points being arranged symmetrically with respect the signal points around the origin.

2. The apparatus for generating special signal point constellations as claimed in claim 1, wherein the distances between adjacent ones of the signal points and the pseudo signal points which constitute the signal point constellations are equal to each other.

3. The apparatus for generating special signal point constellations, comprising:
   means for generating a plurality of signal points of the signal point constellations; and
   means for continuously arranging the signal points of the signal point constellations with the signal points being not symmetrical with respect to the origin on a signal point arrangement plane on which the signal points are arranged, and with the signal point constellations having a signal point arrangement with the signal points being dispersed on a concentric circle centered around the origin but not being arranged symmetrically with respect to the center of the concentric circle.

4. The apparatus for generating special signal point constellations as claimed in claim 3, wherein the distances between adjacent ones of the signal points constituting the signal point constellations are equal to each other.

5. The apparatus for generating special signal point constellations as claimed in claim 3, wherein pseudo signal points are arranged symmetrically with respect to the origin with the signal points whose signal point arrangement is not symmetrical with respect to the origin on the signal point arrangement plane.

6. The apparatus for generating special signal point constellations as claimed in claim 5, wherein the distances between adjacent ones of the signal points and the pseudo signal points which constitute the signal point constellations are equal to each other.

7. In a modulation and demodulation method wherein signal points having signal point constellations are generated upon transmission to modulate and send data and a reception signal is demodulated upon reception to reproduce the data, the improvement wherein the continuous signal point arrangement of the signal point constellations to be generated upon transmission being not symmetrical with respect to the origin of a signal point arrangement plane on which the signal points are arranged, and with the signal points being dispersed on a concentric circle centered at the origin but not being arranged symmetrically with respect to the center of the concentric circle.

8. In a modulation and demodulation method wherein signal points having signal point constellations are generated upon transmission to modulate and send data and a reception signal is demodulated upon reception to reproduce the data, the improvement wherein the continuous signal point arrangement of the signal point constellations to be generated upon transmission being not symmetrical with respect to the origin of a signal point arrangement plane on which the signal points are arranged, and, after the signal points having the signal point constellations are generated, qenerating pseudo signal points symmetrical with the signal points constituting the signal point constellations with respect to the origin.

9. A modulation and demodulation method as claimed in claim 8, wherein the distances between adjacent ones of the signal points and the pseudo signal points which constitute the signal point constellations are equal to each other.

10. A modulation and demodulation method as claimed in claim 8, wherein, after the signal points having the signal point constellations are generated, the signal points constituting the signal point constellations are turned over by 0°/180°.

11. A modulation and demodulation method as claimed in claim 10, wherein the processing of generating the signal points having the signal point constellations and the processing of turning over the signal points, which constitute the signal point constellations, by 0°/180° are performed by code conversion means on the transmission side.

12. A modulation and demodulation method as claimed in claim 10, wherein extraction of a signal timing upon demodulation is performed using the reception signal after having been processed by turning over processing of the signal points, which constitute the signal point constellation, by 0°/180°.

13. A modulation and demodulation method as claimed in claim 10, wherein, when a signal wherein the signal points which constitute the signal point constellations are turned over by 0°/180° is received, the signal points are turned over by 0°/180° to regenerate signal points which have the original signal point constellation.

14. A modulation and demodulation method as claimed in claim 13, wherein the processing of regenerating the signal points having the original signal point constellation is performed on the reception side.

15. A modulation and demodulation method as claimed in claim 14, wherein the processing of regenerating the signal points having the original signal point constellation is performed at a stage next to equalization processing means on the reception side.

16. In a modulation and demodulation method wherein a signal is divided into a plurality of main channels for main data and a secondary channel for secondary data by frequency division and, upon transmission, signal points having signal point constellations are generated in a secondary data system to modulate and transmit the main data and the secondary data, and upon reception, a reception signal is demodulated and signal components of the reception signal in a frequency range are passed through a roll-off filter having a roll-off ratio higher than a roll-off ratio of the secondary data system to regenerate the main data while signal components of the reception signal in another frequency range are passed through another roll-off filter having a roll-off ratio lower than a roll-off ratio of a main data system to regenerate the secondary data, the improvement wherein the signal point arrangement of the continuous signal point constellations to be generated upon transmission in the secondary data system being not symmetrical with respect to the origin of a signal point arrangement plane on which the signal points are arranged.

17. In a modulation and demodulation method wherein a signal is divided into a main channel for main data and a secondary channel for secondary data by frequency division and, upon transmission, signal points having an signal point constellations are generated to modulate and transmit the main data and the secondary data, and upon reception, a reception signal is demodulated to regenerate the main data and the secondary data, the improvement wherein the continuous signal point arrangement of the signal point constellations to be generated upon transmission being not symmetrical with respect to the origin of a signal point arrangement plane on which the signal points are arranged, and with and dispersing the signal points on a concentric circle centered at the origin but not being arranged symmetrically with respect to the center of the concentric circle.

18. A modulation and demodulation method as claimed in claim 16, wherein the distances between adjacent ones of the signal points constituting the signal point constellations are equal to each other.

19. In a modulation and demodulation method wherein a signal is divided into a main channel for main data and a secondary channel for secondary data by frequency division and, upon transmission, signal points having an signal point constellations are generated to modulate and transmit the main data and the secondary data, and upon reception, a reception signal is demodulated to regenerate the main data and the secondary data, the improvement wherein the continuous signal point arrangement of the signal point constellations to be generated upon transmission being not symmetrical with respect to the origin of a signal point arrangement plane on which the signal points are arranged, and after the signal points having the signal point constellations are generated, generating pseudo signal points symmetrical with the signal points constituting the signal point constellations with respect to the origin.

20. A modulation and demodulation method as claimed in claim 19, wherein the distances between adjacent ones of the signal points and the pseudo signal points which constitute the signal point constellations are equal to each other.

21. A modulation and demodulation method as claimed in claim or 19, wherein, after the signal points having the signal point constellations are generated, the signal points constituting the signal point constellations are turned over by 0°/180°.

22. A modulation and demodulation method as claimed in claim 21, wherein the processing of generating the signal points having the signal point constellations and the processing of turning over the signal points, which constitute the signal point constellations, by 0°/180° are performed by code conversion means on the transmission side.

23. A modulation and demodulation method as claimed in claim 21, wherein extraction of a signal timing upon demodulation is performed using the reception signal after having been processed by turning over processing of the signal points, which constitute the signal point constellations, by 0°/180°.

24. A modulation and demodulation method as claimed in claim 21, wherein, when a signal wherein the signal points which constitute the signal point constellations are turned over by 0°/180° is received, the signal points are turned over by 0°/180° to regenerate signal points which have the original signal point constellations.

25. A modulation and demodulation method as claimed in claim 24, wherein the processing of regenerating the signal points having the original signal point constellations is performed on the reception side.

26. A modulation and demodulation method as claimed in claim 25, wherein the processing of regenerating the signal points having the original signal point constellations is performed at a stage next to equalization processing means on the reception side.

27. A modulation and demodulation method as claimed in any claim 16, wherein the signal having the signal point constellations is a signal of secondary data information for the secondary channel.

28. A code conversion processing apparatus which performs code conversion processing for data to be transmitted and generates, upon transmission of the data, signal points having signal point constellations, the code conversion processing apparatus comprising:

signal point generation processing means for generating signal point constellations having a point arrangement in which signal points are not symmetrical with respect to the origin of a signal point arrangement plane on which the signal points are arranged; and pseudo signal point arrangement means for generating and arranging pseudo signal points which are symmetrical with the signal points of the signal point constellations generated from said signal point generation processing means with respect to the origin of the signal point arrangement plane.

29. A code conversion processing apparatus as claimed in claim 28, wherein said signal point generation processing means generates the signal point constellations in which the signal points are spaced by an equal distance from each other on the signal point arrangement plane.

30. A code conversion processing apparatus as claimed in claim 28, wherein said signal points and said pseudo signal points are spaced by an equal distance from each other on the signal point arrangement plane.

31. A code conversion processing apparatus as claimed in claim 28, wherein said signal point generation processing means generates signal point constellations having the point arrangement in which the signal points are distributed on a concentric circle centered at the origin of the signal point arrangement plane but are not symmetrical with respect to the center of the concentric circle.

32. In a code conversion processing method, comprising performing code conversion processing for data to be transmitted to generate signal points having signal point constellations upon transmission, and continuously arranging the signal point arrangement of the signal point constellations generated upon transmission as being symmetrical with respect to the origin of a signal point arrangement plane on which the signal points are arranged.

33. A code conversion processing method as set forth in claim 32, wherein the distances between adjacent ones of the signal points constituting the signal point constellations are equal to each other.

34. In modulation method, comprising:

generating continuously signal points having signal point constellations upon transmission to modulate and send data with a signal point arrangement of the signal point constellations being not symmetrical with respect to an origin of a signal point arrangement plane on which the signal points are arranged, and with the signal point constellations having a signal point arrangement where the signal points are dispersed on a concentric circle centered at the origin but not arranged symmetrically with respect to a center of the concentric circle.

35. A modulation method as claimed in claim 34, wherein the distances between adjacent ones of the signal points constituting the signal point constellations are equal to each other.

36. A modulation method as claimed in claim 34, wherein, after the signal points having the signal point constellations are generated, pseudo signal points which are symmetrical with the signal points constituting the signal point constellations with respect to the origin are generated.

37. In a modulation method wherein signal points having signal point constellations are generated upon transmission to modulate and send data, the improvement comprising continuously arranging the signal point arrangement of the signal point constellations to be generated upon transmission as being symmetrical with respect to the origin of a signal point arrangement plane on which the signal points are arranged, and, after the signal points having the signal point constellations are generated, generating pseudo signal points symmetrical with the signal points constituting the signal point constellations with respect to the origin.

38. A modulation method as claimed in claim 37, wherein the distances between adjacent ones of the signal points and the pseudo signal points which constitute the signal point constellations are equal to each other.

39. A modulation method as claimed in claim 37, wherein, after the signal points having the signal point constellations are generated, the signal points constituting the signal point constellations are turned over by 0°/180°.

40. A modulation method as claimed in claim 39, wherein the processing of generating the signal points having the signal point constellations and the processing of turning over the signal points, which constitute the signal point constellations, by 0°/180° are performed by code conversion means on the transmission side.

41. In a modulation method wherein a signal is divided into a main channel for main data and a secondary channel for secondary data by frequency division and, upon transmission, signal points having a signal point constellations are generated to modulate and transmit the main data and the secondary data, the improvement comprising continuously arranging the signal point arrangement of the signal point constellations to be generated upon transmission as being not symmetrical with respect to the origin of a signal point arrangement plane on which the signal points are arranged, and dispersing the signal points on a concentric circle centered at the origin but being not arranged symmetrically with respect to the center of the concentric circle.

42. A modulation method as claimed in claim 41, wherein the distances between adjacent ones of the signal points constituting the signal point constellations are equal to each other.

43. A modulation method as claimed in claim 41, wherein, after the signal points having signal point constellations are generated, pseudo signal points which are symmetrical with the signal points constituting the signal point constellations with respect to the origin are generated.

44. In a modulation method wherein a signal is divided into a main channel for main data and a secondary channel for secondary data by frequency division and, upon transmission, signal points having a signal point constellations are generated to modulate and transmit the main data and the secondary data, the improvement comprising continuously arranging the signal point arrangement of the signal point constellations to be generated upon transmission as being not symmetrical with respect to the origin of a signal point arrangement plane on which the signal points are arranged, and, after the signal points having the signal point constellations are generated, generating pseudo signal points which are symmetrical with the signal points constituting the signal point constellations with respect to the origin.

45. A modulation method as claimed in claim 44, wherein the distances between adjacent ones of the signal points and the pseudo signal points which constitute the signal point constellations are equal to each other.

46. A modulation method as claimed in claim 44, wherein, after the signal points having the signal point constellations are generated, the signal points constituting the signal point constellations are turned over by 0°/180°.

47. A modulation method as claimed in claim 46, therein the processing of generating the signal points having the signal point constellations and the processing of turning over the signal points, which constitute the signal point constellations, by 0°/180° are performed by code conversion means on the transmission side.

* * * * *

UNITED STATES PATENT AND TRADEMARK OFFICE
CERTIFICATE OF CORRECTION

PATENT NO.:     5,974,090
DATED     :     October 26, 1999
INVENTOR(S):    Kyoko HIRAO, et al.

It is certified that error appears in the above-identified patent and that said Letters Patent is hereby corrected as shown below:

Col. 14, lines 37-38, change "qenerating" to --generating--.

Col. 16, line 2, after "claim" delete "or".

Col. 18, line 48, change "therein" to --wherein--.

Signed and Sealed this

Twenty-seventh Day of June, 2000

*Attest:*

Q. TODD DICKINSON

*Attesting Officer*         Director of Patents and Trademarks